June 25, 1946. H. W. GILFILLAN 2,402,547
COMBINED STARTER AND GENERATOR DRIVE
Filed May 8, 1942 2 Sheets-Sheet 2
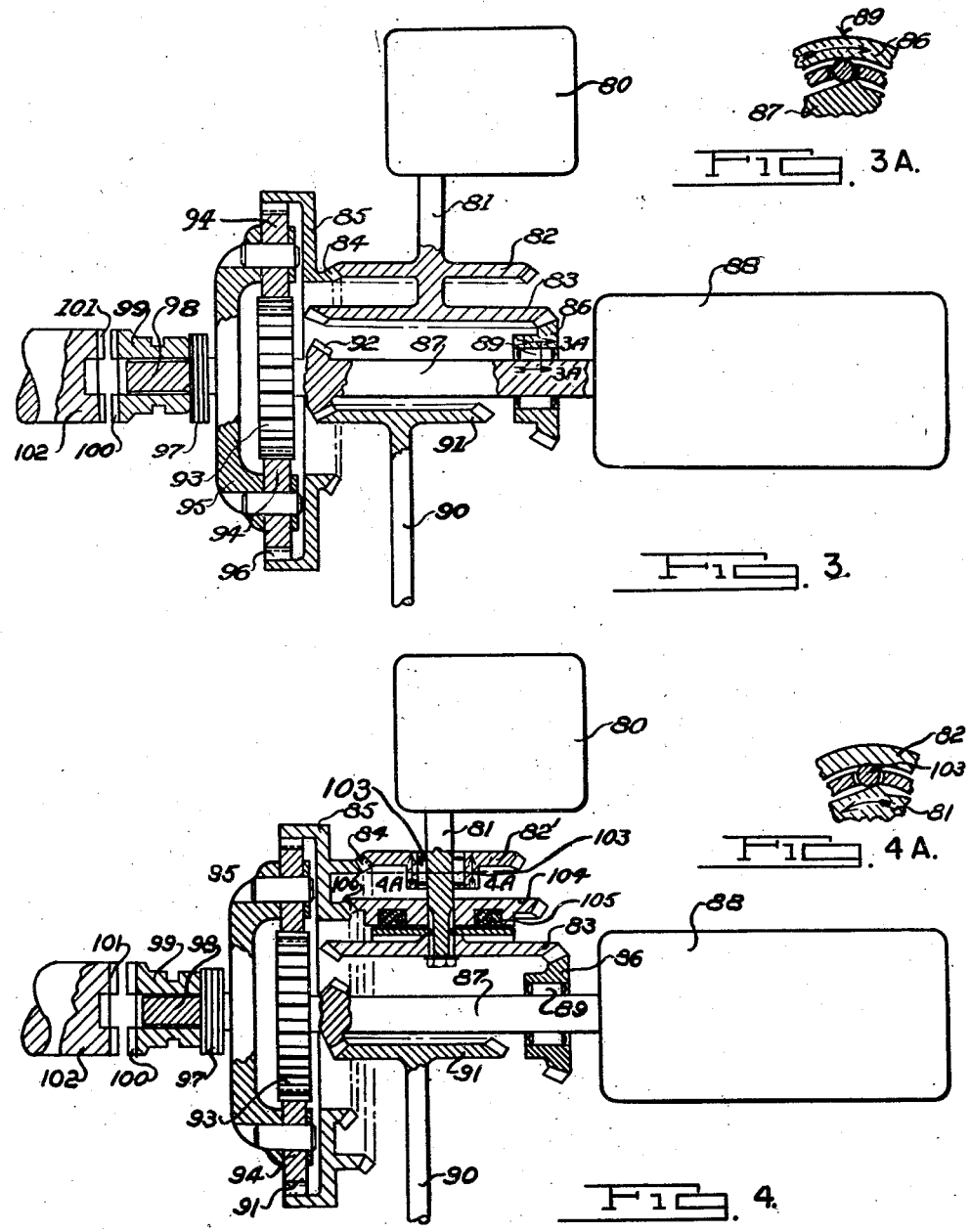
INVENTOR
HENRY W. GILFILLAN
BY
ATTORNEYS Patented June 25, 1946

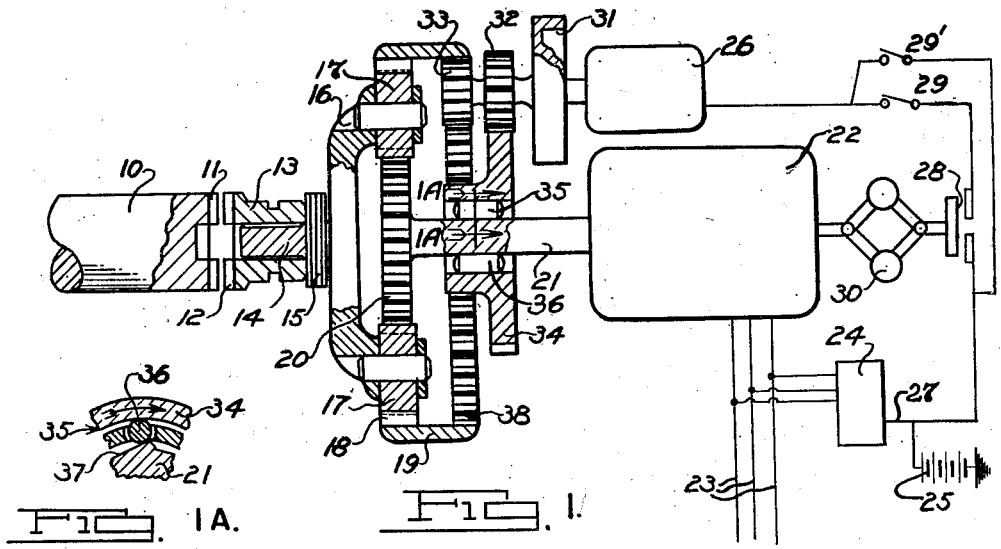

2,402,547

UNITED STATES PATENT OFFICE 2,402,547

COMBINED STARTER AND GENERATOR DRIVE

Henry W. Gilfillan, Detroit, Mich., assignor to Chrysler Corporation, Highland Park, Mich., a corporation of Delaware Application May 8, 1942, Serial No. 442,157

17 Claims. (Cl. 290—36)

This invention pertains to generator drives, particularly drives for A. C. generators where constant frequency output is desired and where variable speed prime movers are employed.

More specifically, the invention relates to a drive for generators used on aircraft.

The power requirements for engine starting and for operation of auxiliaries on aircraft have steadily increased since the beginning of large scale flying activity. In military aircraft the problem of providing an adequte supply of electrical power for use on the ground and in the air has become acute because, in addition to the usual electrically operated devices commonly found on modern transport planes such as: engine synchronizers, lights, radio, propeller pitch controls, tachometers, de-icers, fuel pumps, flap controls, landing gear controls, automatic pilot, compass, brakes, etc; military craft must also include such items as: cameras, bomb releases, machine guns, cannon, etc., which are electrically operated or controlled, The size and weight of batteries necessary for maintaining an adequate supply of ground power for engine starting and other purposes has become excessive. The use of A. C. power has obvious advantages. Alternating current power supply, however, has not been generally adopted mainly because of two objections: the speed and thus the output frequency of the A. C. machine necessarily must vary in accordance with engine speed, and the extra weight of the A. C. unit, which is in addition to the D. C. operated starter mechanism.

It is, therefore, the principal object of the present invention to provide an improved A. C. power supply for aircraft.

Another object is to provide a generator drive for aircraft which causes the generator to be driven at substantially constant speed regardless of variations in engine speed.

A further object is to combine the generator drive with the starter gear train thus avoiding duplication of parts and weight.

Additional objects and advantages will become apparent from the following description which describes several embodiments of the invention.

In the drawings which illustrate the principles of the invention in somewhat diagrammatic form:

Fig. 1 is a schematic view of a combined engine starter and generator drive.

Fig. 1A is a section along line 1A—1A of Fig. 1.

Fig. 2 is a modification of the arrangement shown in Fig. 1.

Figs. 2A, 2B and 2C are sections along the corresponding section lines on Fig. 2.

Fig. 3 is a view of a further modification wherein an auxiliary internal combustion engine is used for generator speed control.

Fig. 3A is a section along line 3A—3A of Fig. 3.

Fig. 4 is a modified form of the Fig. 3 arrangement, and

Fig. 4A is a section along line 4A—4A of Fig. 4.

Referring now to Fig. 1, 10 indicates the crankshaft of the aircraft engine. The crankshaft is provided with jaws 11 which are adapted to be engaged by the jaws 12 of a slidable member 13. The latter is splined on a shaft 14 which is drivingly connected with a carrier 16 by means of an overload clutch 15.

The carrier 16 carries a plurality of planet gears 17 which mesh with the teeth 18 of an annulus gear 19 and the teeth of a sun gear 20. The sun gear 20 is carried by a shaft 21 which is the drive shaft of an alternating current generator 22. The latter is preferably of the three phase type and has output feeders 23 which may be connected to the A. C. load. A rectifier, diagrammatically indicated at 24, is provided for converting a portion of the generator output to direct current for charging a battery 25 and supplying other D. C. operated units.

The engine starting motor 26 is D. C. operated and is connected to the output line 27 of the rectifier 24 (to which the battery 25 is also connected) through a switch 28 controlled by a governor 30, and a pair of switches 29, 29' which are connected in parallel with each other and in series with switch 28 and adapted for manual operation.

The governor 30 may be of any suitable type and is driven at the speed of the generator 22.

The starting motor 26 forms part of an inertia starting system and the shaft thereof carries a flywheel 31 and pinions 32 and 33. The pinion 32 meshes with a gear 34 carried by the shaft 21 and connected thereto by means of a one-way overrunning clutch generally designated by the numeral 35. This clutch may be of any desired construction, the one illustrated (see Fig. 1A) having rollers 36 which cooperate with cam surfaces 37 formed on shaft 21 to establish a driving connection between gear 34 and shaft 21 when said gear tends to be rotated at a speed faster than the speed of the shaft. When the shaft 21 tends to rotate faster than gear 34, the rollers 36 release and permit the shaft to overrun the gear.

Pinion 33 meshes with a set of teeth 38 formed on the annulus gear 19, these teeth may be of the same pitch diameter as the teeth 18 (as illustrated) or some other pitch diameter may be chosen.

The operation of the combined engine starting and generating system is as follows: let it be assumed that the main engine is dead and it is desired to start the same. Starter jaws 11, 12 are disengaged and starting motor 26 is energized from the battery 25 by closing switches 29—29' (the switch 28 being closed when the generator 10 is stationary).

Flywheel 31 is rotated in counterclockwise direction by the motor and the drive divides in two directions. Pinion 32 rotates gear 34 clockwise causing engagement of clutch 35 thereby rotating generator shaft 21 and sun gear 20 in clockwise direction. Pinion 33 drives annulus gear 19 counterclockwise and planet pinions 17 are likewise given counterclockwise rotation.

The ratio of the planetary gearing is such that the tendency for pinion 32 to rotate carrier 16 forwardly (or clockwise) is greater than the tendency for pinion 33 to rotate carrier 16 backward (or counterclockwise). The net result then is that the shaft 14 is rotated forwardly.

When the flywheel 31 has attained the desired speed the member 13 is shifted to engage the jaws 11—12 for starting the main engine, the inertia torque of the flywheel then being applied to the crankshaft 10 through the reduction gearing.

Direct cranking of the main engine may of course, be accomplished by engaging the jaws 11—12 prior to energizing the motor 26.

The sleeve member 13 remains engaged after the engine is started and as the crankshaft 10 comes up to speed (switch 29' being opened) in a forward direction, annulus 19 which is being driven backwardly by the motor 26 becomes the reaction member of the planetary system whereupon the carrier 16 starts to drive forwardly. This causes the sun gear 20 to be driven forwardly at still greater speed and the shaft 21 will overrun the gear 34 as permitted by the overrunning clutch 35.

When the speed of shaft 21 reaches normal, the governor 30 will operate to open switch 28 and de-energize motor 26, the switch 29' having been opened manually when the main engine started. De-energization of motor 26 will of course cause the reaction torque to fall to zero and the generator speed will fall off. This in turn causes the switch 28 to close and the cycle is repeated. If the main engine speed falls off, governor 30 will close switch 28 and start motor 26 to drive annulus 19 in backward direction thus increasing the speed of sun gear 20 and compensating for the decrease in speed of the carrier 16. When the generator comes up to normal speed, the switch 28 will open and if the main engine is still running at subnormal speed, the cycle will repeat. The switch 28 will thus continue to "hunt" at all times during operation of the device and the generator speed will be maintained substantially constant. A variation in generator speed (and frequency) of 5% has been found unobjectionable.

This arrangement also makes provision for generation of ground power with the main engine dead. Under such circumstances the jaws 11—12 are left disengaged and the generator 22 is driven by the motor 26, the power available being limited to the output of motor 26.

The table below sets forth, as an illustrative example, the gear tooth and speed relationships in a typical installation of my improved starting and generator drive:

| Element | No. teeth | Starting | Ground power jaws disengaged | Main engine at 1,800 R. P. M. | Main engine at 3,000 R. P. M. |
|---|---|---|---|---|---|
| | | R. P. M. | R. P. M. | R. P. M. | R. P. M. |
| 33 | 15 | −12,000 | −11,610 | −4,800 | 0 |
| 32 | 31 | −12,000 | −11,610 | −4,800 | 0 |
| 38 | 42 | −4,290 | −4,150 | −1,714 | 0 |
| 34 | 36 | +10,320 | +10,000 | +4,130 | 0 |
| 18 | 70 | −4,290 | −4,150 | −1,714 | 0 |
| 16 | [1] 20 | +100 | +97 | +1,800 | +3,000 |
| 20 | 30 | +10,320 | +10,000 | +10,000 | +10,000 |

[1] Pinion.

In this installation, a 12 H. P. 12,000 R. P. M. D. C. motor is employed. This gives a starting speed of 100 R. P. M. and substantially corresponds to conventional practice.

Fig. 2 illustrates a modification of the Fig. 1 arrangement.

In Fig. 2, the D. C. motor 40 drives a flywheel 41 and a pinion 42. The latter meshes with an annulus 43 which carries an integral pinion 44 disposed in mesh with an annulus 45. The annulus 45 is connected to the drive shaft 46 of the A. C. generator 48 by a one-way roller clutch 47 (Fig. 2A). The latter operates to drivingly connect the gear 45 to the shaft 46 for forward (clockwise) drive and allows the shaft to overrun the gear in forward direction.

The shaft 41' of flywheel 41 is also adapted to drive a pinion 49 through a one-way overrunning clutch 50 which is arranged such that the shaft 41' may overrun the pinion 49 forwardly, but when the direction of rotation of the motor 40 is reversed, a drive is established.

The pinion 49 meshes with teeth 52 carried by an annulus 51. The latter also carries a set of teeth 53 which mesh with planet pinions 54 carried by a carrier 55. These pinions also mesh with a sun gear 56 formed on the generator drive shaft 46. The carrier 55 is connected directly to the engine crankshaft 58 by an overload friction clutch 57.

An overrunning brake device 59 (Fig. 2C) is operatively associated with the annulus 51 and with a stationary part of the structure indicated at 60. The annulus has a reduced portion 61 which is provided with cams 62 for cooperating with rollers 63. The arrangement is such that the annulus 51 may rotate backwardly (counterclockwise), but is prevented from forward (clockwise) rotation by engagement of the rollers 63 which lock the reduced portion 61 to the part 60 in a manner well known in the art.

The portion 61 also carries a shiftable sleeve 64 which has jaws 65 adapted to engage the jaws 66 carried by the stationary structure.

The generator 48 drives a speed-responsive governor 67 for operating a switch 68 and the three phase output thereof is fed to the load through wires 69. A rectifier 70 supplies D. C. to the motor 40 and a battery 71 and the motor is connected to the D. C. source through a reversing switch 72.

The operation of the Fig. 2 device is as follows:

Starting: Switch 72 is closed, connecting terminal 74 thereof to the battery. This causes motor 40 to rotate flywheel 41 forwardly, thereby causing forward rotation of gears 42, 43, 44, 45, engagement of clutch 47, forward rotation of shaft 46 and sun gear 56 and slow backward rotation of annulus 51, the carrier 55 taking the planetary reaction torque. When the sleeve 64 has been accelerated to desired speed, the jaws 65—66 are engaged. This action stops rotation of the annulus 51 and causes carrier 55 to be rotated forwardly. The inertia torque of the flywheel 41 is thus applied to the crankshaft 58 through the planetary gears and the torque limiting clutch 57.

As the main engine comes up to speed, the carrier 55 becomes the driving element and the switch 72 is thrown to reverse position. The latter action causes the motor 40 to reverse its rotation, switch 68 being closed until the generator comes up to speed, and overrunning clutch 50 engages thereby rotating annulus 51 backwardly. This disengages starter jaws 65—66 which are of the ramped type and the annulus 51 becomes the reaction member. The sun gear 56 then is accelerated and the generator 48 tends to come up to rated speed. The overrunning clutch 47 disengages to permit shaft 46 to overrun annulus 45 and gears 43, 44 and 45 run idly.

When the crankshaft 58 reaches running speed the governor 67 will open switch 68 and deenergize motor 40, the gear ratios being such that the generator speed will be normal at zero speed of the flywheel 41 under these conditions. If the crankshaft speed falls off, the switch 68 will close and the motor 40 will immediately start to drive the annulus 51 through the overrunning clutch 50 thereby to compensate for the decrease in speed of the generator drive.

The Fig. 2 arrangement also makes provision for ground power with the main engine dead as can be understood from the following table which illustrates the ratios and speeds of a typical installation:

| Element | No. teeth | Starting | Ground power jaws disengaged | Main engine at 1800 R. P. M. | Main engine at 3000 R. P. M. |
|---|---|---|---|---|---|
| | | R. P. M. | R. P. M. | R. P. M. | R. P. M. |
| 42 | 12 | +23,000 | −12,000 | −4,800 | 0 |
| 43 | 100 | +2,760 | −1,440 | −576 | 0 |
| 44 | 13 | +2,760 | −1,440 | −576 | 0 |
| 45 | 100 | +359 | −188 | −75 | 0 |
| 56 | 30 | +359 | +10,000 | +10,000 | +10,000 |
| 55 | 20 | +108 | 0 | +1,800 | +3,000 |
| 53 | 70 | 0 | −4,290 | −1,715 | 0 |
| 52 | 84 | 0 | −4,290 | −1,715 | 0 |
| 49 | 30 | 0 | −12,000 | −4,800 | 0 |

With this arrangement, the speed of the annulus 51 at the instant of engagement of the sleeve 64 is 154 R. P. M. backwardly which gives a starting speed to crankshaft 58 of 108 R. P. M. forwardly.

Fig. 3 illustrates a combined starting and generator drive system with speed compensation wherein an internal combustion engine is substituted for the electric motor. This scheme contemplates the use of a relatively high speed internal combustion engine, but as the speed practically obtainable with such an engine is lower than with an electric motor, the gearing is necessarily more bulky and for this reason bevel gearing is used for compactness.

In Fig. 3, the engine 80, which is preferably a gasoline engine drives a shaft 81 which carries a pair of bevel gears 82—83. The gear 82 meshes with teeth 84 of an annulus gear 85 and the gear 83 meshes with a gear 86. The latter is adapted to be connected with the shaft 87 of an A. C. generator 88 through a one-way overrunning clutch 89 (see Fig. 3A).

A shaft 90, connected to the generator shaft 87 by means of gears 91—92, is adapted to be rotated by a hand crank (not shown). A sun gear 93 carried on the outer end of the generator shaft meshes with planet pinions 94 which are rotatably mounted on the carrier 95. The pinions 94 also mesh with teeth 96 on annulus 85. The carrier 95 drives, or is driven by, the stub shaft 98 through the overload clutch 97. A shiftable sleeve 99 carries jaws 100 which are adapted to engage the jaws 101 on crankshaft 102.

In the Fig. 3 arrangement, the auxiliary engine 80 is started by cranking the shaft 90, the jaws 100—101 being disengaged. The shaft 87 is thus rotated forwardly, the clutch 89 overrunning. The generator rotor acts as a flywheel in this instance and when the rotor has been accelerated to desired speed, the sleeve 99 (which is rotating forwardly) is engaged. This stops the planet carrier, the crankshaft 102 being resistant to rotation, and the inertia torque of the generator rotor is applied to the shaft 81 by way of the annulus 85. When the auxiliary engine 80 fires, the sleeve 99 is released as is permitted by the momentary reversal of driving torque.

The engine 80 will then drive the generator 88 through clutch 89 and furnish ground power. This arrangement permits the elimination of the battery if desired. The shaft 90 is preferably provided with a disengageable and removable crank.

When it is desired to start the main engine, the sleeve 99 is engaged whereupon the inertia torque of the generator is applied to the crankshaft 102, the reverse rotation of the engine 80 furnishing reaction torque. After the main engine starts, the engine 80 functions to regulate the speed of the generator 88 in the same manner as previously described for Fig. 1 except that the engine 80 runs continuously. The following table gives the speed relationships in a typical installation:

| Element | No. teeth | Starting (main engine) | Ground power jaws disengaged | Main engine at 1500 R. P. M. | Main engine at 3000 R. P. M. |
|---|---|---|---|---|---|
| | | R. P. M. | R. P. M. | R. P. M. | R. P. M. |
| 82 | 30 | −5,000 | −4,850 | −2,750 | −500 |
| 83 | 33 | −5,000 | −4,850 | −2,750 | −500 |
| 84 | 30 | −5,000 | −4,850 | −2,750 | −500 |
| 86 | 16 | +10,320 | +10,000 | +5,670 | +1,031 |
| 96 | 50 | −5,000 | −4,850 | −2,750 | −500 |
| 95 | [1] 13 | +100 | +97 | +1,500 | +3,000 |
| 93 | 25 | +10,320 | +10,000 | +10,000 | +10,000 |

[1] Pinion.

Fig. 4 illustrates a modification of Fig. 3 wherein provision is made for a two speed drive between the engine 80 and the annulus 85. The mechanism is otherwise identical with Fig. 3 and operates in a similar manner. The gear 82' is driven by the shaft 81 through an overrunning clutch 103 (Fig. 4A), the arrangement being such that the gear can overrun the shaft. A second drive gear 104 is provided which is adapted to be connected to the shaft 81 by a clutch, preferably a magnetic clutch as indicated at 105. The gear 104 meshes with a set of teeth 106 formed on annulus 85.

At low main engine speeds the clutch 105 is energized and the engine 80 exerts its torque through gear 104, while at high main engine speeds, the clutch 105 is deenergized and the clutch 103 engages to provide reaction torque through gear 82'.

This arrangement is somewhat more flexible than that of Fig. 3 and the higher ratio eliminates the need for supercharging the auxiliary engine at high altitudes. The following table gives typical operating data:

| Element | No. teeth | Starting | Ground power jaws disengaged | Main engine at 1500 R. P. M. | Main engine at 3200 R. P. M. |
|---|---|---|---|---|---|
| | | R. P. M. | R. P. M. | R. P. M. | R. P. M. |
| 104 | 30 | −5,000 | −4,850 | −2,750 | −200 |
| 83 | 33 | −5,000 | −4,850 | −2,750 | −435 |
| 82' | 23 | −14,100 | −13,700 | −7,760 | −435 |
| 106 | 30 | −5,000 | −4,850 | −2,750 | −200 |
| 84 | 50 | −5,000 | −4,850 | −2,750 | −200 |
| 86 | 16 | +10,320 | +10,000 | +5,670 | +896 |
| 85 | 15 | −5,000 | −4,850 | −2,750 | −200 |
| 95 | [1] 13 | +100 | +97 | +1,500 | +3,200 |
| 93 | 25 | +10,320 | +10,000 | +10,000 | +10,000 |

[1] Pinion.

The arrangements of Figs. 1 and 2 may be modified to provide for a substantial supply of D. C. during flight without the use of a rectifier by suitably adjusting the ratio of the gearing.

For example the following table sets forth the ratios and speeds in a combined starting and generator control system such as that illustrated in Fig. 1 wherein the motor 26 will operate as a generator at high engine speeds.

| Element | No. teeth | Starting | Ground power jaws disengaged | Main engine at 1800 R. P. M. | Main engine at 3000 R. P. M. |
|---|---|---|---|---|---|
| | | R. P. M. | R. P. M. | R. P. M. | R. P. M. |
| 33 | 16 | −10,000 | −10,000 | +2,140 | +10,700 |
| 32 | 40 | −10,000 | −10,000 | +2,140 | +10,700 |
| 38 | 97 | −1,650 | −1,650 | +353 | +1,765 |
| 34 | 40 | +10,000 | +10,000 | −2,140 | −10,700 |
| 18 | 85 | −1,650 | −1,650 | +353 | +1,765 |
| 16 | [1] 35 | +100 | +100 | +1,800 | +3,000 |
| 20 | 15 | +10,000 | +10,000 | +10,000 | +10,000 |

[1] Pinion.

Similarly, the arrangement of Fig. 2 may be adapted to provide a source of D. C. from the motor 40 as follows:

| Element | No. teeth | Starting | Ground power jaws disengaged | Main engine at 1800 R. P. M. | Main engine at 3000 R. P. M. |
|---|---|---|---|---|---|
| | | R. P. M. | R. P. M. | R. P. M. | R. P. M. |
| 42 | 13 | +23,000 | −12,000 | +2,400 | +12,000 |
| 43 | 39 | +7,667 | −4,000 | +800 | +4,000 |
| 44 | 14 | +7,667 | −4,000 | +800 | +4,000 |
| 45 | 161 | +667 | −348 | +70 | +348 |
| 56 | 15 | +667 | +10,000 | +10,000 | +10,000 |
| 54 | 35 | +100 | 0 | +1,800 | +1,800 |
| 53 | 85 | 0 | −1,765 | +253 | +1,765 |
| 52 | 136 | 0 | −1,765 | +253 | +1,765 |
| 49 | 20 | 0 | −12,000 | +2,400 | +12,000 |

Having described several preferred embodiments of my invention, I wish it understood that the invention is not to be considered as limited thereby, the scope thereof being set forth in the claims appended below.

I claim:

1. In combination with an internal combustion engine having a crankshaft, engine starting apparatus including a driven sleeve adapted to be engaged with said crankshaft for starting the engine; a prime mover for driving said sleeve; reduction gearing connecting said prime mover with said sleeve; an engine auxiliary adapted to be driven by said crankshaft; means including said reduction gearing and sleeve for connecting said auxiliary to said crankshaft; and means operable by said auxiliary during operation of the engine for controlling the speed of said prime mover.

2. In combination with an internal combustion power plant which includes a main engine, a starting motor; gearing connecting said starting motor with said main engine; an engine auxiliary; means connecting said auxiliary with said gearing in such manner that said auxiliary may receive drive from both the main engine and the starting motor; and control means interconnecting said auxiliary and said starting motor for regulating the speed of the starting motor as a function of the speed of the auxiliary.

3. The combination set forth in claim 2 wherein the control means comprises a speed responsive means driven by said auxiliary.

4. The combination set forth in claim 2 wherein the auxiliary consists of a constant frequency A. C. generator and switch means controlled by said generator as a function of the speed thereof for energizing said starting motor.

5. In an engine starting system, a starting sleeve adapted for engagement with the engine crankshaft; planetary reduction gearing including a carrier connected with said sleeve and having pinions meshing with a sun gear and an annulus gear respectively; a starter motor; and driving means connecting said motor with said annulus gear and said sun gear, comprising a shaft carried by the sun gear, a gear carried by said shaft, a one-way clutch disposed between said shaft and gear, and pinion means connecting said motor with the last named gear and the annulus gear, the arrangement being such that energization of said starter motor will cause both said annulus gear and said sun gear to be driven thereby.

6. In combination with an engine having a crankshaft, a planet gear carrier adapted for connection to said crankshaft; planet pinions carried by said carrier; annulus and sun gears respectively disposed in mesh with said pinions; a shaft carried by said sun gear; a gear on said shaft having an overrunning connection therewith; a starter motor having driving pinions disposed in mesh with said last named gear and said annulus gear whereby said crankshaft is adapted to be rotated by said starter motor for starting and said sun gear is adapted to be driven by said crankshaft under normal running of said engine.

7. The combination set forth in claim 6 wherein said sun gear shaft is connected to an engine auxiliary for driving the same during operation of the engine, and means for disconnecting the carrier from the crankshaft whereby said auxiliary may be driven by the starter motor.

8. The combination set forth in claim 6 wherein the sun gear shaft is drivingly connected to an electric generator, the ratio of the gearing being so selected that normal running speed of the engine will produce a selected normal generator speed.

9. The combination set forth in claim 6 wherein the sun gear shaft is drivingly connected to an electric generator, the ratio of the gearing being so selected that normal running speed of the engine will produce a selected normal generator speed; and means for varying the speed of the starter motor during running of the engine whereby a substantially constant generator speed may be maintained regardless of fluctuations in the speed of the engine.

10. In combination, an engine adapted for operation at varying speeds; a generator adapted to be driven by said engine through gearing; a motor connected with said gearing and so arranged with respect thereto that the speed thereof may be made additive or subtractive to the speed of the engine; and means for controlling the speed of the motor as a function of the speed of the generator.

11. In combination, an engine adapted for operation at varying speeds; a generator adapted to be driven by said engine through gearing; a motor connected with said gearing and so arranged with respect thereto that the speed thereof may be made additive or subtractive to the speed of the engine; a speed responsive control carried by the generator, and means connecting said control with the motor such that the motor speed is controlled as a function of the generator speed.

12. In an engine starting system, a starting sleeve adapted for engagement with the engine crankshaft; planetary reduction gearing including a carrier connected with said sleeve and having pinions meshing with a sun gear and an annulus gear respectively; a starter motor; and driving means connecting said motor with said annulus gear and said sun gear, comprising a shaft carried by the sun gear, a gear carried by said shaft, a one-way clutch disposed between said shaft and gear, and pinion means connecting said motor with the last named gear and the annulus gear, the arrangement being such that energization of said starter motor will cause both said annulus gear and said sun gear to be driven thereby; and means stopping rotation of the annulus gear thereby to cause the inertia torque thereof to be transmitted through said planet pinions to crankshaft.

13. In combination with an engine, a starter motor for starting said engine; an auxiliary adapted to be driven by the engine; a planetary gearset having the carrier thereof connected with the engine and the sun gear thereof connected with said auxiliary; a driving connection between said starter motor and the annulus gear of said gearset; a driving connection between said starter motor and said sun gear, said last driving connection including an overrunning device permitting said sun gear to overrun said motor but preventing the motor from overrunning the sun gear.

14. The combination set forth in claim 13 wherein the driving connection between the starter motor and the annulus gear includes a pair of driven gears fixed to said annulus gear and a pair of driving gears journaled on the shaft of said motor and means for selectively clutching said driving gears to said shaft.

15. In the combination set forth in claim 13, independently operable means for rotating the sun gear whereby said starter motor may be started.

16. In the combination set forth in claim 13 means for starting said starter motor including manually operable means for driving said sun gear.

17. In combination, a variable speed internal combustion engine, an alternating current generator to be driven at a substantially constant speed drivingly connected to said engine, a motor also drivingly connected to said generator for maintaining the constant speed of the generator when the generator speed due to the drive of the engine varies, differential gearing interposed between the generator and engine and between the generator and motor to interconnect the same, the ratios of the respective input and output values of said gearing from the engine and motor to the generator being such that the algebraic sum of the speeds imparted by the engine and motor to the generator is said substantially constant speed, and motor speed control means responsive to deviations in speed of the generator from said constant speed due to deviations in the speed of the engine for impressing upon the input from the motor to the generator such speed as to return the generator speed to said substantially constant speed.

HENRY W. GILFILLAN.